US006466165B2

(12) United States Patent
Obayashi

(10) Patent No.: US 6,466,165 B2
(45) Date of Patent: Oct. 15, 2002

(54) ADAPTIVE ARRAY ANTENNA

(75) Inventor: Shuichi Obayashi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/880,915

(22) Filed: Jun. 15, 2001

(65) Prior Publication Data

US 2002/0057219 A1 May 16, 2002

(30) Foreign Application Priority Data

Jun. 16, 2000 (JP) ....................................... 2000-181577

(51) Int. Cl.[7] ............................. H01Q 3/22; H04B 1/00
(52) U.S. Cl. .......................................... 342/372; 455/69
(58) Field of Search ................................ 342/372, 374; 455/562, 69

(56) References Cited

U.S. PATENT DOCUMENTS 5,041,835 A * 8/1991 Matsumoto et al. ........ 342/374
5,475,392 A * 12/1995 Newberg et al. ............ 342/375
5,859,611 A * 1/1999 Lam et al. .................. 342/368

* cited by examiner

*Primary Examiner*—Gregory C. Issing
(74) *Attorney, Agent, or Firm*—Oblon, Spivak, McClelland, Maier & Neustadt, P.C.

(57) ABSTRACT

An adaptive array antenna comprising array antenna elements, first and second phase control circuits for transmission data packet, a distributor distributing the transmission data packet to one of the first and second phase control circuits based on the destination, and phase shift amount control circuit controlling the phase shift amount of the first and second phase control circuits based on the destination.

6 Claims, 6 Drawing Sheets

ADAPTIVE ARRAY ANTENNA

CROSS-REFERENCE TO RELATED APPLICATIONS

This application is based upon and claims the benefit of priority from the prior Japanese Patent Application No. 2000-181577, filed Jun. 16, 2000, the entire contents of which are incorporated herein by reference.

BACKGROUND OF THE INVENTION

1. Field of the Invention

The present invention relates to an adaptive array antenna.

2. Description of the Related Art

In recent years, a broad band high speed radio communications have been put into intensive practical use. As one example, there is provided a subscriber radio access system. A patent application of an adaptive array antenna for controlling the phase shift of an IF local signal with a phase shifter in this system has been filed by the present inventor (U.S. patent application Ser. No. 09/310198). When the adaptive array antenna is used in a base station of the radio system, directivity can be scanned to obtain the position of each terminal. Moreover, the directivity is changed in a direction of each terminal every time transmission/reception is performed with each terminal. Therefore, interference waves coming from directions other than the terminal direction having a low directivity gain can be suppressed.

FIG. 1 shows one example of such an adaptive array antenna. The adaptive array antenna comprises: a control circuit 1; a transmission IF signal generation circuit 2 connected to the control circuit 1; a divider 3 connected to the transmission IF signal generation circuit 2; a plurality of phase control circuits 4 connected to the divider 3; filters 5 connected to the respective phase control circuits 4; buffer circuits 6 connected to the filters 5; a local oscillator 7 for converting a transmission IF signal to an RF signal for transmission; a divider 8 connected to the local oscillator 7; a plurality of frequency converters 9 connected to respective divided output terminals of the divider 8 and buffer circuits 6; filters 10 connected to the frequency converters 9; buffer circuits 11; filters 12; antenna array elements 13; and a phase shift amount control circuit 14 connected to the phase control circuits 4.

Transmission information formed in an information block is formed as consecutive data packets, and the transmission IF(intermediate frequency) signal generated by the transmission IF signal generation circuit 2 based on the data packet supplied from the control circuit 1 is distributed to the plurality of phase control circuits 4 via the divider 3.

On the other hand, a phase shift coefficient for a transmission destination user of the data packet is sent to the phase shift amount control circuit 14 from the control circuit 1, and the phase shift amount of the phase control circuits 4 is changed for each user.

The transmission IF signal output from the phase control circuits 4 is sent to the frequency converters 9 via the filters 5 and buffer circuits 6. The frequency converters 9 use a local signal sent from the local oscillator 7 via the divider 8 to convert the transmission IF signal to an RF(radio frequency) signal. The RF signal is transmitted from the antenna array elements 13 via the filters 12.

The phase shift amount is determined for each user in this manner, and a radio wave is transmitted via the antenna array elements 13, so that the radio wave can be transmitted in a direction toward the user with satisfactory directivity.

On the other hand, for the subscriber radio access system (base station), a time division multiple access (TDMA) system is generally used in reception, and a time division multiple (TDM) system is used in transmission.

In the TDMA reception system, the radio waves transmitted from a plurality of user terminals are received, and the data packet is reconstructed for each user. However, since the respective user terminals exist in different distances from the base station in most cases, a time difference exists in a radio wave reaching time. Therefore, a region called a guard time for absorbing the time difference is taken between the respective data packets.

On the other hand, since each user terminal receives the radio wave (downlink signal) transmitted from the base station in the TDM transmission system, it is unnecessary to consider the difference of the time for which the radio wave reaches each terminal. Generally from a viewpoint of transmission efficiency, no guard time is positioned.

FIG. 2 shows a generalized format of a downlink frame of a radio communication system in which the TDM system is used.

A control packet is positioned in a top of the frame, and followed by data packet 1, data packet 2, . . . data packet N for separate users. The control packet comprises a header, control information (SI, and the like), and an error correction code (FEC). Each data packet comprises a header, data, and FEC. The control packet includes assignment of a communication channel, request for frequency change, order for communication stop, and the like. Additionally, the control packet of an uplink frame includes a request for user registration, request for communication, request for communication stop, and the like. Examples of a header content include a transmitter radio station ID, destination radio station ID, synchronous capturing signal, and the like.

In this manner, the TDM frame does not include the guard time usually included in the aforementioned TDMA frame. Therefore, when the TDM frame is transmitted via the conventional adaptive array antenna as shown in FIG. 1, a phase shift of the phase control circuits 4 for each user must be performed by a speed sufficiently smaller (faster) than an inverse number of a baud rate because of absence of the guard time.

Here, quadrature modulator ICs are frequently used as the phase control circuits 4. In the quadrature modulator IC, the phase shift amount changeover speed depends on a bandwidth of an Ich/Qch BB signal input. The bandwidth is about 20 MHz. However, the baud rate is as much as about 21 Mbps in the subscriber radio access system, and the speed cannot be set to be sufficiently smaller than the inverse number of such a high speed baud rate in the phase control circuits 4 formed of the quadrature modulator IC. In the TDM system having no guard time, when the destination user of the packet changes, several bits (header) in the top of the packet are still changing in the phase shift amount in a worst case when the packet passes through the phase control circuits. When the transmission IF signal generated based on the packet passes through the phase control circuits 4 in this state, the transmission direction determined by the phase control circuits 4 cannot be estimated because the phase shift of the phase control circuits 4 is not completed, and the signal is not transmitted to a desired destination in some case. This causes an interference wave in the whole system, and as a result, it is possible that frequency utilization efficiency is greatly influenced.

As described above, for the conventional adaptive array antenna, since there is no guard time in the frame format of the radio communication system using the TDM transmission system, the phase control circuit having a sufficiently high operation speed is necessary. However, to raise the phase shift amount control speed, the control speed needs to be set to be sufficiently smaller than the inverse number of the baud rate. In this case, there is a problem that an IF local signal phase shift circuit satisfying such conditions is expensive.

BRIEF SUMMARY OF THE INVENTION

Accordingly, the present invention is directed to method and apparatus that substantially obviates one or more of the problems due to limitations and disadvantages of the related art.

In accordance with the purpose of the invention, as embodied and broadly described, the invention is directed to an adaptive array antenna comprising:

array antenna elements;

first and second phase control circuits which control phase shift amount of a transmission data packet and supply the transmission data packet to the array antenna elements;

a distributor configured to distribute the transmission data packet to one of the first and second phase control circuits based on a destination user information of the data packet; and a phase shift amount control circuit configured to control the phase shift amount of the first and second phase control circuits based on the destination user information of the data packet distributed to the first and second phase control circuits.

In accordance with the purpose of the invention, as embodied and broadly described, the invention is directed to a transmission method of an adaptive array antenna comprising:

receiving a data packet and destination user information of the data packet;

determining whether or not the destination user information of the data packet is identical to the destination user information of a preceding data packet;

distributing the data packet and the destination user information to a path which is different from a path to which the preceding data packet and the destination user information are distributed;

setting a phase control amount to a phase control circuit based on the destination user information;

activating the phase control circuit;

generating a transmission burst intermediate frequency signal based on the distributed data packet and supplying the generated transmission burst intermediate frequency signal to the phase control circuit; and converting the transmission burst intermediate frequency signal output from the phase control circuit to a radio signal to be transmitted from the adaptive array antenna.

According to an aspect of the present invention or embodiments consistent with the present invention, a phase shift amount can be securely changed for each user even without using a high-speed and expensive phase control circuit.

DETAILED DESCRIPTION OF THE INVENTION

An embodiment of an adaptive array antenna according to embodiments of the present invention will be described hereinafter with reference to the drawings.

Figure 3:
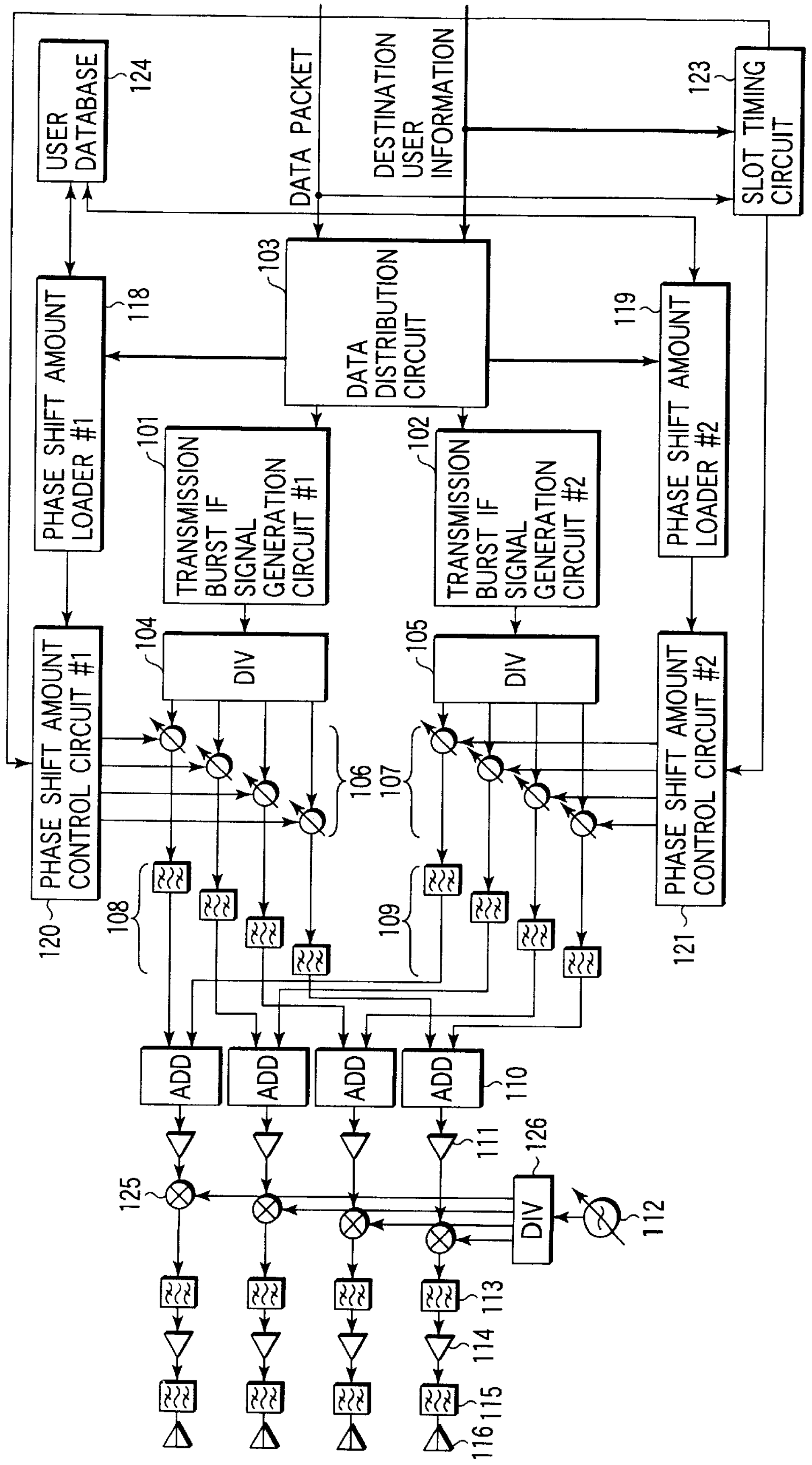
FIG. 3 is a diagram showing the first embodiment of an adaptive array antenna according to embodiments of the present invention.

FIG. 3 is a block diagram of the first embodiment of the adaptive array antenna. The adaptive array antenna comprises a data distribution circuit 103 for each user, which distributes a destination user information and a data packet for each user to one of first and second channels; and first and second transmission burst IF signal generation circuits 101 and 102 connected to output ends of the first and second channels of the distribution circuit 103. The distribution circuit 103 distributes a transmission data packet to either the first transmission burst IF signal generation circuit 101 or the second transmission burst IF signal generation circuit 102 in accordance with the destination user information.

Outputs of the first and second transmission burst IF signal generation circuits 101 and 102 (the outputs are distributed, and are not continuous waves but burst waves) are supplied to first and second phase control circuit groups 106 and 107 via dividers 104 and 105, respectively. The first and second phase control circuit groups 106 and 107 can control phase shift amounts with respect to the respective data packets in accordance with the destination user information.

Outputs of the first and second phase control circuit groups 106 and 107 are supplied to an addition circuit group 110 via first and second filter groups 108 and 109. The addition circuit group 110 adds corresponding outputs of phase control circuits of the first and second phase control circuit groups 106 and 107, and reconstructs the data packet.

The output of the addition circuit group 110 is supplied to an antenna array element group 116 via a buffer circuit group 111, frequency converter group 125, filter group 113, buffer circuit group 114, and filter group 115. The data packet (transmission burst IF signal) obtained by the addition circuit group 110 is amplified by the buffer circuit group 111, and subsequently converted to an RF frequency transmission signal by the frequency converter group 125 based on a signal output from a local oscillator 112 via a divider 126. The phase shift amount of the transmission RF signal is controlled in accordance with the destination user information, and therefore the antenna array element group 116 transmits a radio wave in a direction in which a user exists. Each element of the antenna array element group 116 is a single antenna element or an array element called a sub-array, and a plurality of array elements are positioned in a predetermined shape, for example, a linear shape.

The first and second phase control circuit groups 106 and 107 are connected to first and second phase shift amount control circuits 120 and 121, respectively. The first and second phase shift amount control circuits 120 and 121 are connected to first and second phase shift amount loaders 118 and 119, respectively. The first and second phase shift amount loaders 118 and 119 are connected to a user database 124. The first and second phase shift amount control circuits 120 and 121 are connected to a slot timing circuit 123. The user data distribution circuit 103 distributes the data packet to the first and second transmission burst IF signal generation circuits 101 and 102. Additionally, the circuit 103 distributes the destination user information of the data packet to the first channel phase shift amount loader 118 to which a transmission signal for a first user is distributed, and the second channel phase shift amount loader 119 to which the transmission signal for a second user is distributed. The first and second phase shift amount loaders 118 and 119 access the user database 124, and load respective user phase shift amount coefficients to the first and second phase shift amount control circuits 120 and 121.

Figure 1:
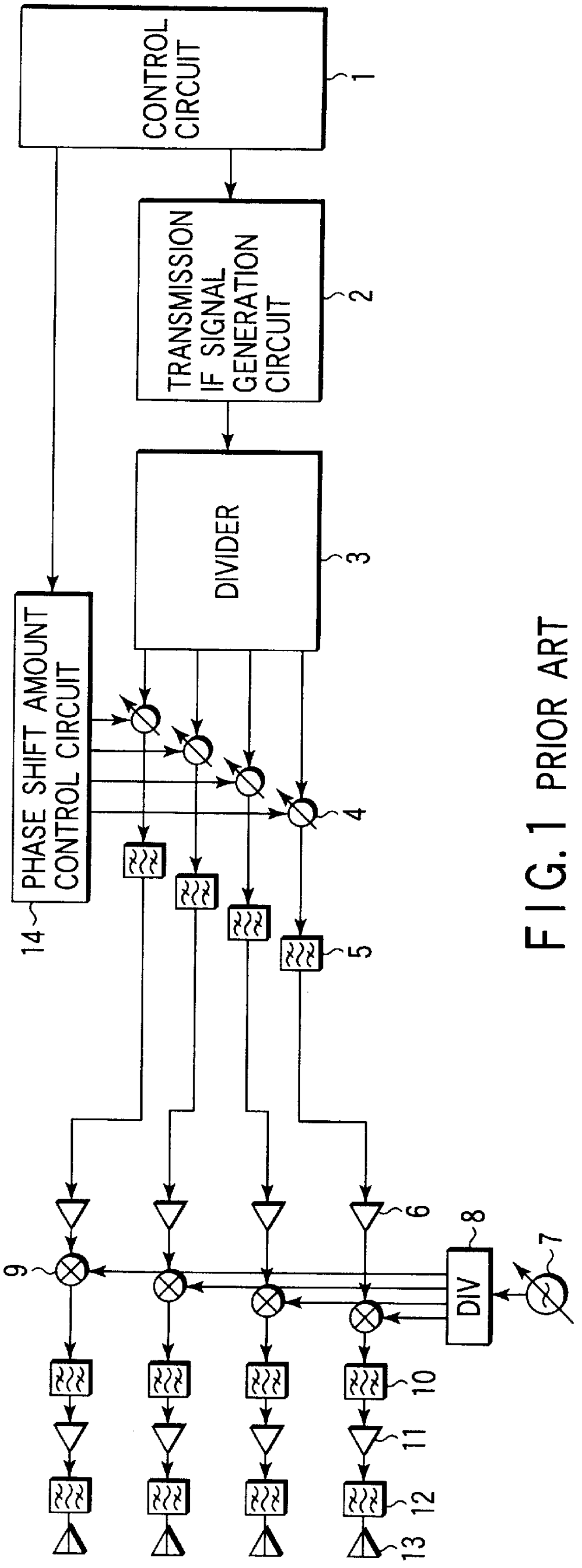
FIG. 1 PRIOR ART
FIG. 1 is a diagram showing a conventional adaptive array antenna.
Figure 2:
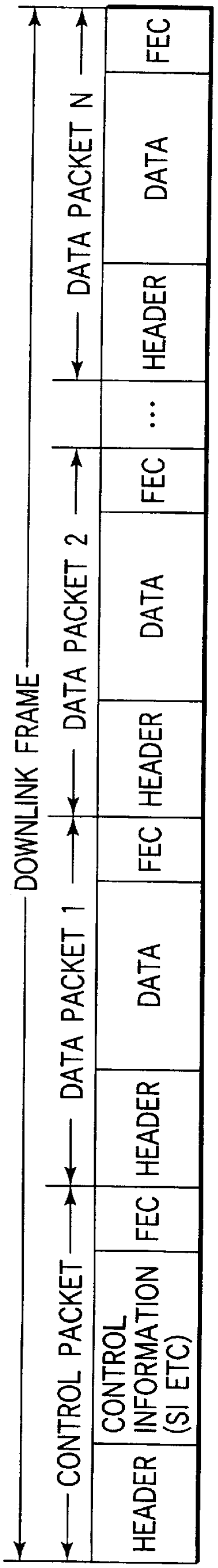
FIG. 2 PRIOR ART
FIG. 2 is a diagram showing a frame format of a downlink in a TDM system.

An operation will next be described for a case in which a TDM transmission frame with a header and FEC added before and after data as shown in FIG. 2 is input to the adaptive array antenna.

The TDM transmission frame is input to the user data distribution circuit 103 and slot timing circuit 123. The destination user information of the respective data packets is simultaneously input to the user data distribution circuit 103 and slot timing circuit 123.

The user data distribution circuit 103 outputs the data packet alternately to the first and second transmission burst IF signal generation circuits 101 and 102 every time a destination user changes. When the packet for a certain user is output to the first transmission burst IF signal generation circuit 101, the destination user information is output to the first phase shift amount loader 118, and the packet for the user continues to be output to the first transmission burst IF signal generation circuit 101. When the destination user changes, another user packet is output to the second transmission burst IF signal generation circuit 102, and the destination user information is output to the second phase shift amount loader 119.

When the destination user information is input to the first phase shift amount loader 118, a phase shift weighting coefficient of the antenna array element for transmission to the input user is extracted from the user database 124, and loaded to the first phase shift amount control circuit 120.

When the destination user information is input to the second phase shift amount loader 119, the phase shift weighting coefficient of the antenna array element for transmission to the input user is extracted from the user database 124, and loaded to the second phase shift amount control circuit 121.

The slot timing circuit 123 activates the first or second phase shift amount control circuit 120 or 121 which is now deactive (to which no signal is distributed) upon elapse of a predetermined delay time from the change in the destination user. The data packet is supplied to the phase control circuit groups 106 and 107 through the data distribution circuit 103, first and second transmission burst IF signal generation circuits 101 and 102, and dividers 104 and 105. Thus, the data packet for the previous destination user is still passing through the phase control circuit groups 106 and 107 when the destination user changes. Therefore, there is provided the predetermined delay time to activate the phase control circuit groups 106 and 107. The predetermined delay time is such a time at which the phase shift control for the first and second phase control circuit groups 106 and 107 is completed between the timing when the destination user changes and the timing when the transmission burst IF signal is supplied to the first and second phase control circuit groups 106 and 107 from the first and second dividers 104 and 105. A timing at which the first and second phase shift amount control circuits 120 and 121 are activated is determined in consideration of a delay time for signal generation in the first and second transmission burst IF signal generation circuits 101 and 102.

Figure 4:
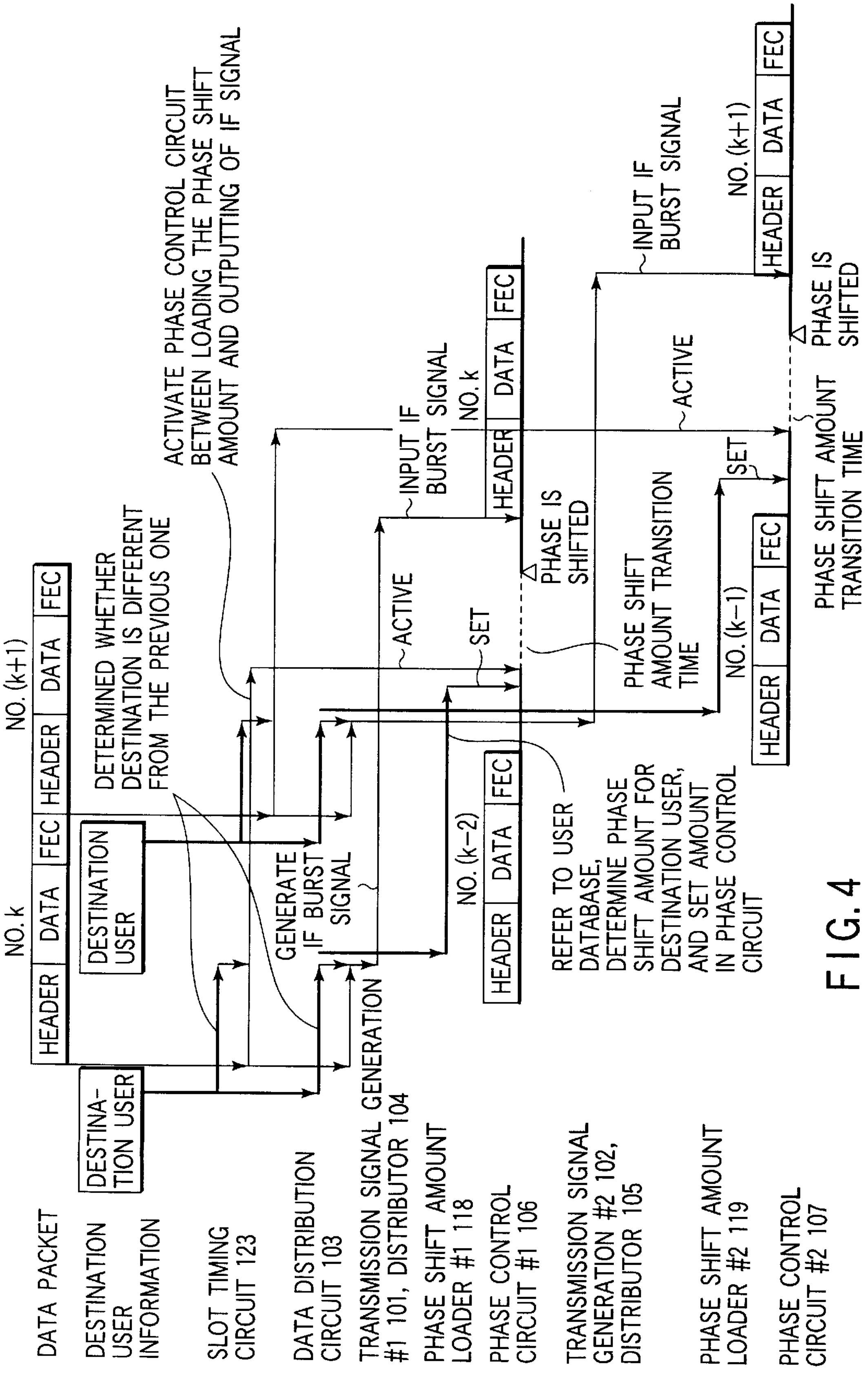
FIG. 4 is a diagram showing a control timing of the adaptive array antenna according to embodiments of the present invention.

FIG. 4 shows a time relation including the above-mentioned timing. With reference to FIG. 4, a control of transmitting the respective user data packets will next be described.

In FIG. 4, for simplified description, it is assumed that a TDM frame is formed of plurality of packets, each packet being for different users.

The user data distribution circuit 103 determines whether or not the destination user information of each data packet agrees with the destination of the previous data packet. With the same user, the data packet is output to the same transmission burst IF signal generation circuit as the previous data packet distribution destination. With a different user, the data packet is output to the transmission burst IF signal generation circuit different from the previous data packet distribution destination. In this case, since the respective data packets are directed to different users, data packets No. (k−2), No. k, . . . are output to the first transmission burst IF signal generation circuit 101, and data packets No. (k−1), No. (k+1), . . . are output to the second transmission burst IF signal generation circuit 102.

With regard to the data packet No. k, the user data distribution circuit 103 supplies the data packet to the first transmission burst IF signal generation circuit 101. After a predetermined period of time, the first transmission burst IF signal generation circuit 101 generates a transmission burst IF signal relating to the data packet No. k and supplies it to the first phase control circuit group 106. Since the destination user information is supplied to the first phase shift amount loader 118, the first phase shift amount loader 118 reads out a phase shift coefficient for controlling the phase shift amount and loads it to the first phase shift amount control circuit 120. Since the destination user information of the data packet No. k is different from that of the data packet No. (k−1), the slot timing circuit 123 sets the phase shift coefficient to the first phase control circuit group 106 during a time period during which the first transmission burst IF signal generation circuit 101 generates the transmission burst IF signal. After (or at the same time of) setting the phase shift coefficient, the slot timing circuit 123 activates the first phase shift amount control circuit 120 to make the phase shift amount depend on the phase shift coefficient.

The data packet No. k input to the first transmission burst IF signal generation circuit 101 is mapped in a quadrature BB signal or the like, subsequently subjected to quadrature modulation, and subjected to frequency conversion, if necessary. In principle, no signal is output while no data packet is distributed or input. Therefore, no quadrature BB signal is output from the transmission burst IF signal generation circuit 101. Additionally, a power supply of an amplifier or the like inside the transmission burst IF signal generation circuit 101 is turned off.

In this case, the first phase shift amount loader 118 refers to the user database 124, reads a phase shift coefficient for controlling the phase shift amount in accordance with the destination user information of the data packet No. k, and inputs (sets) the coefficient into the first phase shift amount control circuit 120. After a predetermined delay time from the start of the header of the data packet No. k, the slot timing circuit 123 activates the first phase shift amount control circuit 120. The activating timing is a timing between the loading of the phase shift coefficient by the first phase amount loader 118 and the supply of the transmission IF burst signal to the first phase control circuit group 106. After the phase shift amount of the first phase control circuit group 106 is changed based on the phase shift coefficient, the IF burst signal (corresponding to the data packet No. k) distributed to the number of arrays by the first divider 104 is input to the first phase control circuit group 106, and subjected to phase shift control.

Since the user of the data packet No. (k+1) is different from that of the data packet No. k, the user data distribution circuit 103 outputs the packet to the second transmission burst IF signal generation circuit 102. The data packet No. (k+1) input to the second transmission burst IF signal generation circuit 102 is also mapped in the quadrature BB signal or the like, subsequently subjected to quadrature modulation, and subjected to frequency conversion if necessary. In principle, no signal is output while no data packet is input. Therefore, no quadrature BB signal is output inside the transmission burst IF signal generation circuit 102. Additionally, the power supply of the amplifier or the like inside the circuit is turned off.

In this case, the second phase shift amount loader 119 refers to the user database 124, reads the phase shift coefficient for controlling the phase shift amount in accordance with the destination user information of the data packet No. (k+1), and inputs (sets) the coefficient into the second phase shift amount control circuit 121. After the phase shift coefficient is set, the slot timing circuit 123 activates the second phase shift amount control circuit 121, and defines the phase shift amount of the second phase shifter group 107. A timing at which the second phase shift amount control circuit 121 is activated is a timing at which the phase shift amount of the second phase shifter group 107 can be defined before input of the second transmission burst IF signal into the second phase shifter group 107. Thereafter, the IF burst signal (corresponding to the data packet No. (k+1)) distributed to the number of arrays by the second distributor 105 is inputted to the second phase shifter group 107, and subjected to phase shift control.

The IF signals having the phase shift amounts controlled are output from the first and second phase control circuit groups 106 and 107, and added by the adder group 110 so that the original data packet is reconstructed. The data packet obtained by the addition is supplied to the subsequent high frequency circuit, and transmitted to each user from the antenna array element group 116 with a desired directivity pattern.

Two-system phase control circuits are arranged in this manner, and selectively activated every time the user changes. The control of the phase shift amount is completed until the transmission burst IF signal for the changed user is input to the phase control circuit. Therefore, a control speed of the phase control circuit (as well as the phase shift amount control circuit) is not so fast, the phase shift amount can also be changed in response to the change of the user even in the TDM transmission system having no guard time, and a phase-shift controlled radio wave can be emitted for any data packet.

Figure 5:
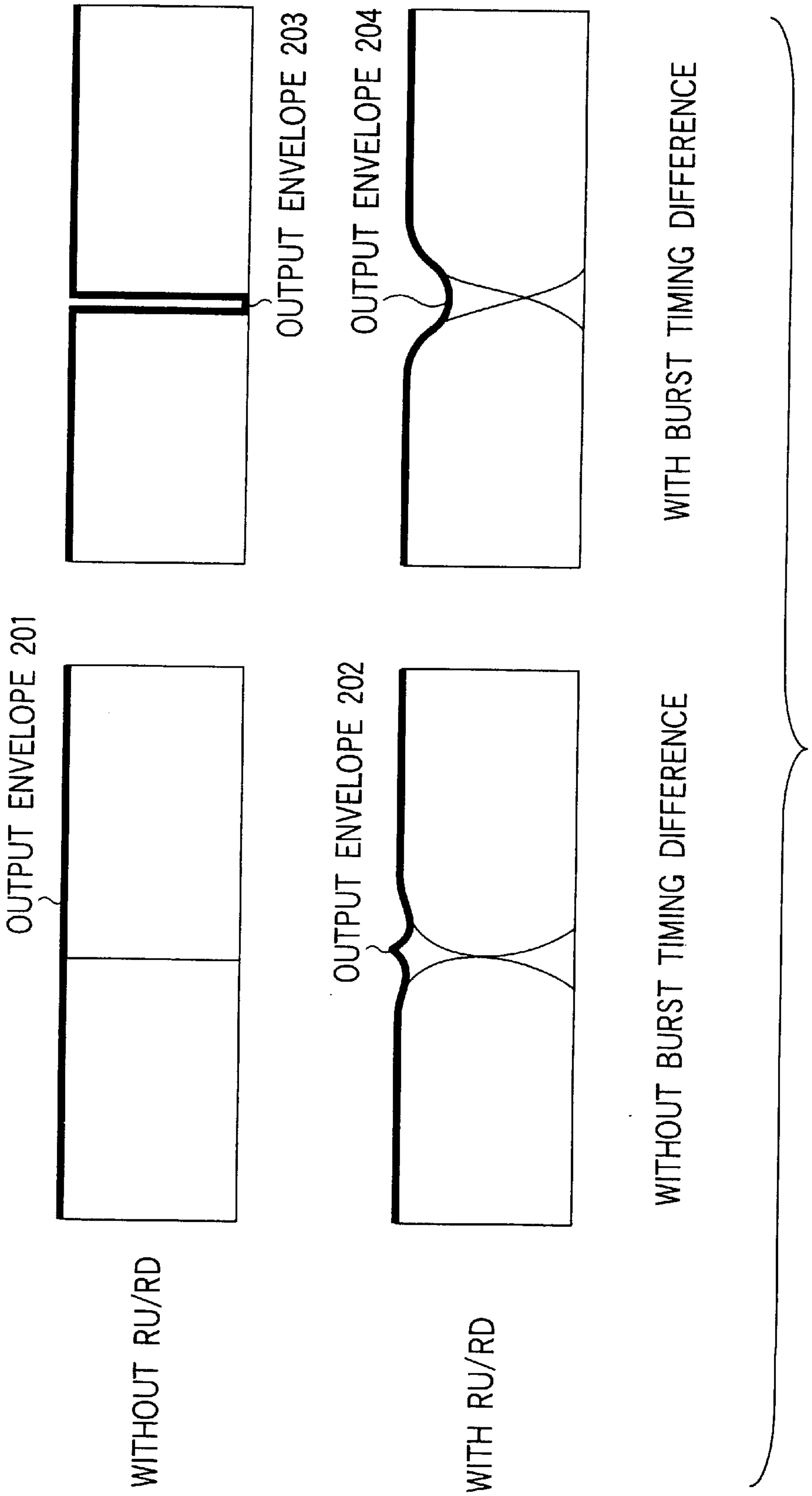
FIG. 5 is a diagram showing a change of an output envelope in a case in which ramp-up and ramp-down components are added or not added before and after an output burst signal in the adaptive array antenna of the present invention.
Figure 6:
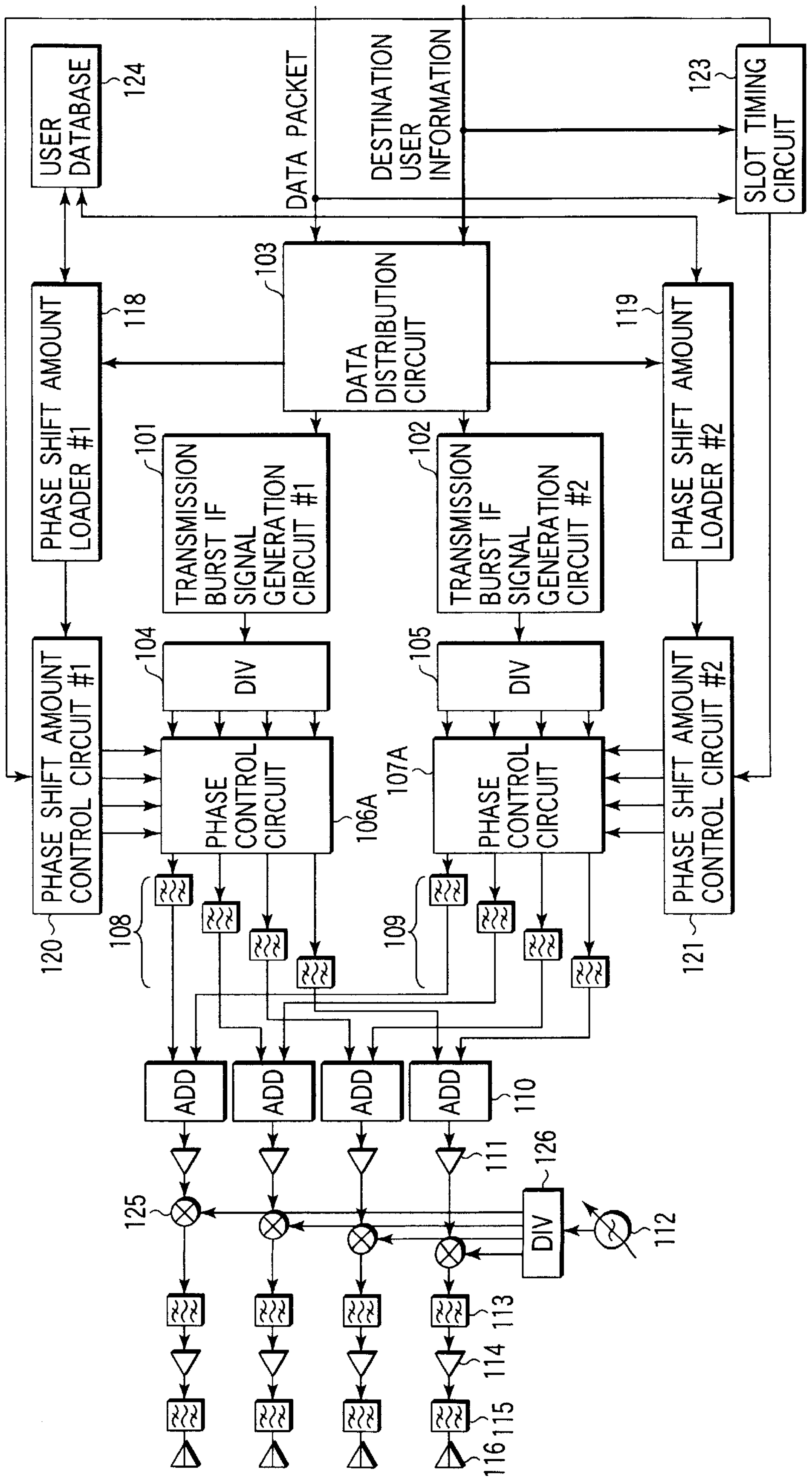
FIG. 6 is a diagram showing the second embodiment of an adaptive array antenna according to embodiments of the present invention.

FIG. 5 is a diagram showing a change of an output envelope in a case in which a ramp-up component and ramp-down component are added or not added before and after the transmission burst IF signal in the adaptive array antenna of the present invention.

In FIG. 5, envelopes 201 and 203 show examples of the output envelope change when the burst signal is output as it is in the transmission burst IF signal generation circuit of the adaptive array antenna in FIG. 3.

Envelopes 202 and 204 show examples in which a ramp-up and ramp-down components with appropriate properties (e.g., curved changes represented by route roll off, humming window, and the like) are added before and after the transmission burst IF signal in the adaptive array antenna of the present invention. Concretely, when a signal amplitude is controlled by gradually increasing or decreasing the quadrature BB signal inside the transmission burst IF signal generation circuits 101 and 102 of the adaptive array antenna in FIG. 3, the ramp-up and ramp-down components are added. Moreover, if necessary, the amplitude may be controlled by additionally turning on/off the power supply of the amplifier or the like in the transmission burst IF signal generation circuits 101 and 102 at an appropriate timing determined by considering a time constant of a capacitor or the like loaded on a power supply line.

Furthermore, the output envelopes 201 and 202 show a case in which a wiring of a synchronizing clock of two-system phase control circuits is appropriate and there is no error (timing error) in the control signal to the circuit. The output envelopes 203 and 204 show a case in which a changeover timing of the distribution circuit 103 deviates because of an influence of the synchronizing clock wiring.

As shown in FIG. 5, when synchronism is not established in the adaptive array antenna of FIG. 3, and if the signal is output as it is, an output level of the adder 110 varies widely, as shown by the output envelope 203, and a spurious higher harmonic wave arises.

In this case, when the ramp-up and ramp-down components are added before and after the transmission burst IF signal, a rapid fluctuation can be suppressed, as shown by the output envelope 204. Therefore, a spectrum strain can be suppressed also in a frequency aspect, and interference with the adjacent channel can be effectively reduced.

As described above, according to the embodiment of the present invention, the packet data for each user is distributed to one of a plurality of burst signal generation circuits, and subjected to phase shift control by separate phase control circuits in the adaptive array antenna in which radiation properties are changed by the phase shift amount control circuit connected to each array element. Thereby, even when the antenna is used in the high speed communication system, a relatively low speed and inexpensive phase control circuit (as well as the phase shifter) can be used. The antenna can be applied to the TDM system in which no guard time is positioned.

Figure 7:
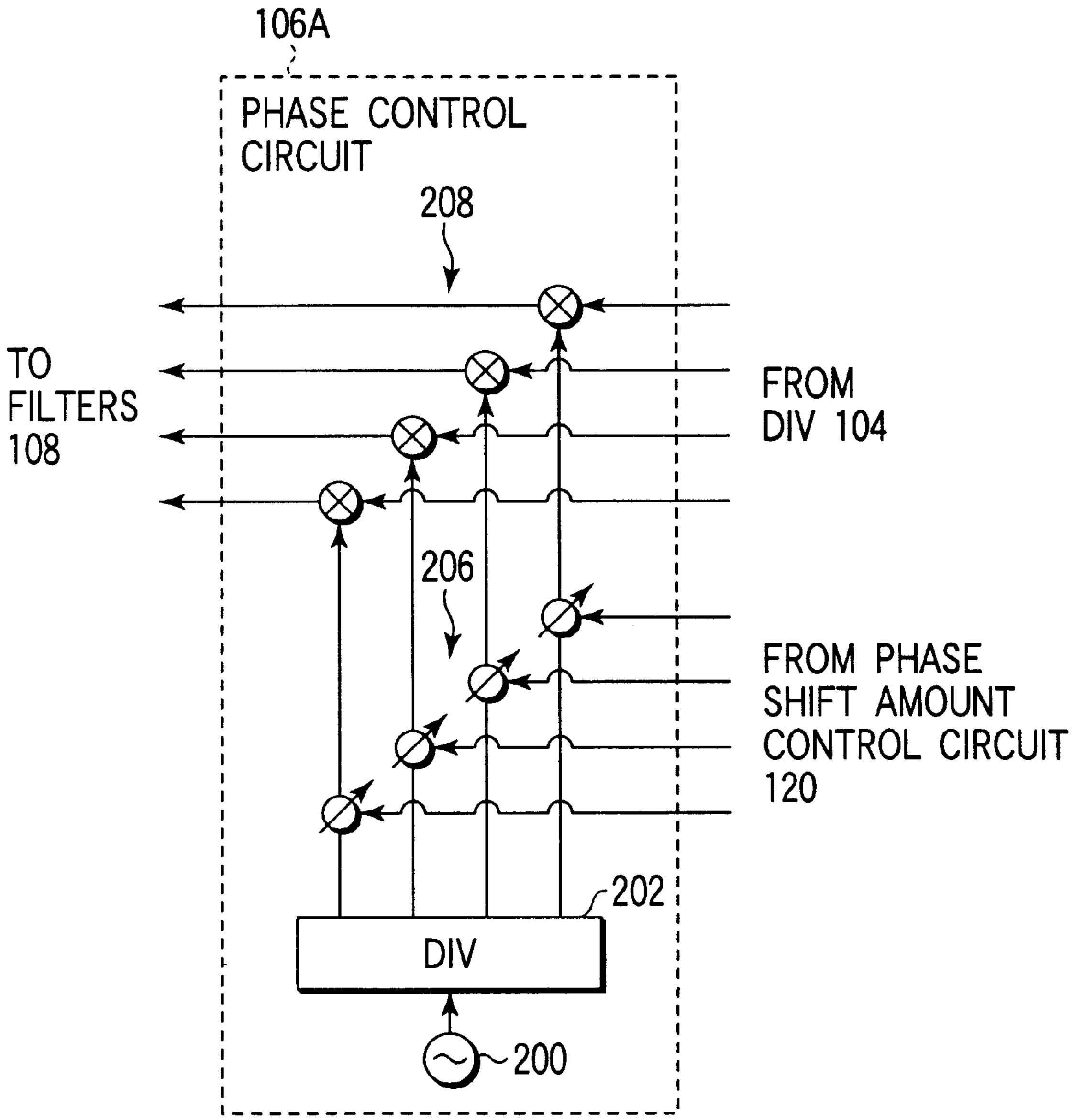
FIG. 7 is a diagram showing details of the phase control circuit of FIG. 6.

FIG. 7 shows the second embodiment of an adaptive array antenna according to embodiments of the present invention. The second embodiment is different from the first embodiment at the details of the phase control circuit 106 and 107 which are configured as shown in FIG. 7. Though FIG. 7 shows only the phase control circuit 106A, the phase control circuit 107A is also configured as shown in FIG. 7.

The phase control circuit 106A or 107A comprises a frequency converter group 208 to which the outputs from the divider 104 or 105 are supplied. The transmission burst IF signal generated from the generation circuits 101 or 102 is called a first IF signal in the second embodiment. The frequency converter group 208 converts the first IF signal to a second IF signal. The phase control circuit 106A or 107A further comprises a local oscillator 200, divider 202, and a phase shifter group 204. The phase shifter group may be formed of quadrature modulators. The local signal output from the local oscillator 200 is supplied to the frequency converter group 208 through the divider 206 and the phase shifter group 204. The shift amount of the phase shifter group 204 is controlled by the phase shift amount control circuit 120 or 121.

The embodiment of the present invention has been described above, but the transmission burst IF signal generation circuit for the distribution in the adaptive array antenna of the present invention is not limited first and second circuits, and the data may be distributed to three or more IF signal generation circuits. The destination user information is separated from the data packet. However, the destination user information may be extracted from the header of the data packet.

What is claimed is:

1. A transmitter for supplying a data packet to array antenna elements, the transmitter comprising:

a distributor configured to receive the data packet and its destination user information and distribute the data packet to one of first and second paths based on the destination user information; and first and second transmission signal generation circuits which receive the data packets distributed to the first and second paths and generate first and second transmission burst intermediate frequency signals;

first and second dividers which receive the first and second transmission burst intermediate frequency signals and divide the first and second transmission burst intermediate frequency signals into a number of signals which equals to the number of the array antenna elements;

first phase control circuits configured to receive outputs from the first divider;

second phase control circuits configured to receive outputs from the second divider;

a first phase shift amount control circuit configured to control phase shift amounts of the first phase control circuits based on the destination user information;

a second phase shift amount control circuit configured to control phase shift amounts of the second phase control circuits based on the destination user information;

adders configured to add outputs of the first phase control circuits and the second phase control circuits; and frequency converters configured to convert outputs of the adders to radio signals to be supplied to the array antenna elements.

2. The transmitter according to claim 1, wherein the first and second phase shift amount control circuits control the phase shift amounts of the first and second phase control circuits such that the radio signals radiated from the array antenna elements are directed to the destination user.

3. The transmitter according to claim 1, wherein the distributor distributes a data packet to the first path, distributes a succeeding data packet to the first path if the destination user information of the data packet is identical to the destination user information of the preceding data packet, and distributes a succeeding data packet to the second path if the destination user information of the data packet is different from the destination user information of the preceding data packet.

4. The transmitter according to claim 3, wherein the distributor distributes the destination user information to the first path if the distributor distributes the data packet to the first path and distributes the destination user information to the second path if the distributor distributes the data packet to the second path.

5. The transmitter according to claim 1, wherein said first and second phase shift amount control circuits complete control of the phase shift amount of the first and second phase control circuits before the first and second transmission burst intermediate frequency signals corresponding to the data packet are supplied to the first and second phase shift control circuits.

6. The transmitter according to claim 1, wherein plural data packets are combined without a guard time between the packets to form a frame.

* * * * *